US010721124B2

(12) United States Patent
Patil et al.

(10) Patent No.: US 10,721,124 B2
(45) Date of Patent: Jul. 21, 2020

(54) CLOUD MANAGEMENT CONNECTIVITY ASSURANCE

(71) Applicant: Cisco Technology, Inc., San Jose, CA (US)

(72) Inventors: Santosh Ramrao Patil, Santa Clara, CA (US); Kirti Yeshwant Barve, Goa (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 281 days.

(21) Appl. No.: 15/947,107

(22) Filed: Apr. 6, 2018

(65) Prior Publication Data

US 2019/0312775 A1 Oct. 10, 2019

(51) Int. Cl.
*H04L 12/24* (2006.01)
*H04L 12/26* (2006.01)

(52) U.S. Cl.
CPC ...... *H04L 41/0816* (2013.01); *H04L 41/0631* (2013.01); *H04L 41/0806* (2013.01); *H04L 41/0859* (2013.01); *H04L 41/0873* (2013.01); *H04L 41/12* (2013.01); *H04L 43/0811* (2013.01)

(58) Field of Classification Search
CPC ............. H04L 41/0893; H04L 12/4633; H04L 41/0806; H04L 41/0886; H04L 41/12; H04L 67/34; H04L 41/0816; H04L 41/0803; H04L 41/0681; H04L 41/08; H04L 12/12; H04L 67/2861
See application file for complete search history.

(56) References Cited

U.S. PATENT DOCUMENTS

| 8,832,777 | B2 | 9/2014 | Raleigh et al. |
| 8,897,174 | B2 | 11/2014 | Komarevtsev |
| 9,119,017 | B2 | 8/2015 | Sinha |
| 9,300,548 | B2 * | 3/2016 | Asthana ............ H04L 41/5025 |
| 9,438,648 | B2 * | 9/2016 | Asenjo ................. H04L 65/403 |
| 9,544,207 | B2 | 1/2017 | Allen et al. |
| 9,692,713 | B2 * | 6/2017 | Saavedra ............... H04L 49/00 |
| 9,709,978 | B2 * | 7/2017 | Asenjo .................. G06Q 10/06 |
| 9,712,486 | B2 * | 7/2017 | Johnson ................. H04W 4/70 |
| 9,755,900 | B2 | 9/2017 | Tenginakai et al. |
| 9,929,964 | B2 * | 3/2018 | Saavedra ............ H04L 12/2867 |
| 9,989,958 | B2 * | 6/2018 | Asenjo ............... G05B 19/4185 |
| 10,205,632 | B2 * | 2/2019 | Saavedra ............ H04L 41/0816 |
| 10,476,735 | B2 * | 11/2019 | Pfaff ....................... H04L 45/38 |
| 2016/0057025 | A1 * | 2/2016 | Hinrichs ............... G06F 15/173 709/224 |
| 2017/0126552 | A1 * | 5/2017 | Pfaff ................... G06F 16/2282 |

* cited by examiner

*Primary Examiner* — Sargon N Nano
(74) *Attorney, Agent, or Firm* — Polsinelli PC

(57) ABSTRACT

The disclosed technology relates a system is configured to generate a protected configuration for a network device based on network connectivity data for a plurality of devices in a managed network associated with a cloud management system. The system is further configured to receive a configuration change for the managed network, determine that the configuration change is incompatible with the protected configuration, and generate a notification that the configuration change is incompatible with the protected configuration.

20 Claims, 6 Drawing Sheets

CLOUD MANAGEMENT CONNECTIVITY ASSURANCE

TECHNICAL FIELD

The subject matter of this disclosure relates in general to the field of computer networks, and more specifically for management of network devices and resources by a cloud management system.

BACKGROUND

A managed network, such as an enterprise private network or a data center network, may contain a large number of entities distributed across the network. These entities may include, for example, endpoint machines, access points, routers, switches, servers, firewalls, gateways, or other computing devices. The entities may also include logical, virtual, or other types of entities such as virtual machines, containers (an instance of container-based virtualization), or resources (e.g., applications, endpoint groups, etc.). In addition to being different types, these entities may be grouped in different departments, located in different geographical locations, and/or serve different functions.

Some modern technologies enable a network to be remotely managed. This scheme is sometimes referred to as cloud managed networking, where one or more networks (which may be geographically dispersed) may be managed by a cloud management system which communicates with the one or more networks over the internet. Depending on the implementation, cloud managed networking may provide centralized management, visibility, and control without the cost and complexity of controller appliances or overlay management software. For example, cloud managed networks may enable network administrators to control and manage a network from a single interface that may be deployed at a different geographical location from the managed network. Furthermore, cloud managed networks further provide more efficient and effective scalability. However, there are still several technical limitations associated with this emerging technology area.

BRIEF DESCRIPTION OF THE FIGURES

In order to describe the manner in which the above-recited and other advantages and features of the disclosure can be obtained, a more particular description of the principles briefly described above will be rendered by reference to specific embodiments that are illustrated in the appended drawings. Understanding that these drawings depict only embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
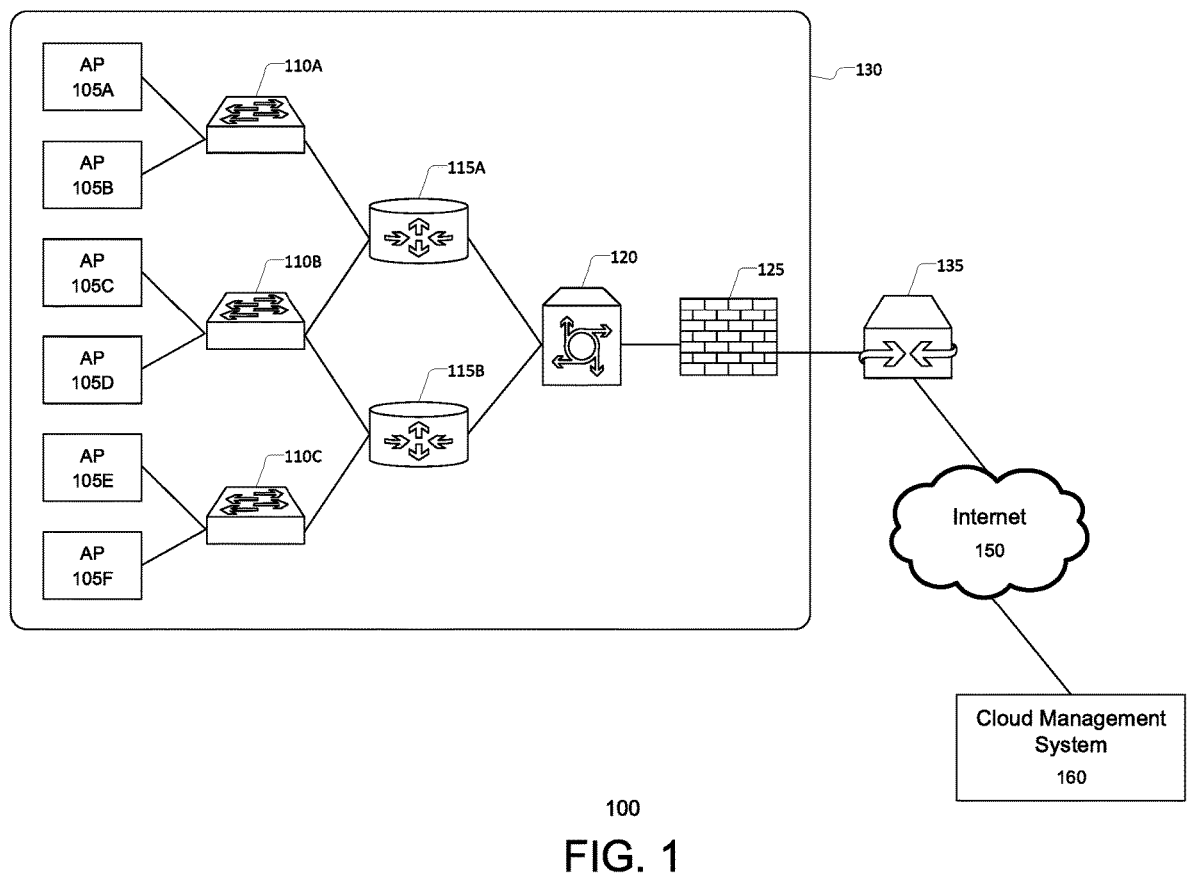
FIG. 1 is a conceptual block diagram illustrating an example network environment 100 managed by a cloud management system 160, in accordance with various embodiments of the subject technology.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

A cloud managed network is typically a network of devices or other network entities that are managed by a cloud management system. The cloud management system may be deployed at a different geographic location than the devices of the cloud managed network and be implemented as a cloud service. Accordingly, the devices of the cloud managed network may communicate with the cloud management system via one or more other networks that may include, for example, the internet, internet service provider (ISP) networks, public networks, or a combination of different types of networks. A network administrator may login to a cloud management system and manage the devices in the cloud managed network remotely.

However, for the cloud management system to be able to manage the devices, connectivity between each device and the cloud management system must be maintained. In other words, if communication between the cloud management system and a network device is severed, the cloud management system will no longer be able to access the device, change network configurations for the device, or otherwise manage the device. A common cause of a loss of connectivity between the cloud management system and a network device is a network configuration change either at the network device or at another device along the path from the network device to the cloud management system.

These configuration changes may occur automatically via some network process or as a result of human error. For example, a network issue may arise and a network administrator may decide that a certain configuration change may be needed to resolve the issue. However, the network administrator may be mistaken about the solution to the network issue or may not be aware about indirect or unintended consequences that may result from the configuration change. These indirect or unintended consequences may include a loss of connectivity between one or more network devices and the cloud management system. The configuration changes may be initiated (by a network administrator or process) at the device, at a network controller, or at the cloud management system.

Once the cloud management system loses connectivity with a device, it is no longer able to manage the device. If the loss of connectivity is a result of a configuration change on that device (rather than on a device on the path between the device and the cloud management system), the cloud management system is unable to rollback or correct the configuration change in order to restore connectivity.

Aspects of the subject technology relate to assuring connectivity between network devices in a cloud managed network and a cloud management system as well as reestablishing connectivity if it is lost. Various embodiments of the disclosure are discussed in detail below. While specific implementations are discussed, it should be understood that this is done for illustrative purposes only. A person skilled in the relevant art will recognize that other components and configurations may be used without departing from the spirit and scope of the disclosure.

FIG. 1 is a conceptual block diagram illustrating an example network environment 100 that includes a network managed by a cloud management system 160, in accordance with various embodiments of the subject technology. Various embodiments are discussed with respect to a managed network 130 at a deployment site that is connected, via the internet 150, to a cloud management system 160 for illustrative purposes. However, these embodiments and others may be applied to a wide variety of other network environments and configurations. For example, the network environment 100 may include, for example, any one or more of a cellular network, a satellite network, a personal area network (PAN), a local area network (LAN), a wide area network (WAN), a broadband network (BBN), the Internet, and the like. The network environment 100 can be a public network, a private network, or a combination thereof. The network environment 100 may be implemented using any number of communications links associated with one or more service providers, including one or more wired communication links, one or more wireless communication links, or any combination thereof. Additionally, the network environment 100 can be configured to support the transmission of data formatted using any number of protocols.

The managed network 130 shown in FIG. 1 includes a number of network devices including access points 105A-F, switches 110A-C, routers 115A-B, a network address translation (NAT) server 120, and a firewall 125. The managed network 130 may connect to an internet service provider (ISP) gateway 135, which further connects the devices of the managed network 130 to the cloud management system 160 through the internet 150.

However, the components and topological configuration of managed network 130 and the network environment 100 as a whole are shown in FIG. 1 for illustrative purposes and other types of network devices (e.g., servers, network controllers, endpoints, middle boxes, virtual machines, etc.) and configurations (e.g., for data centers, campus networks, etc.) may also be applicable. Furthermore, some managed networks may include a great deal more network devices (e.g., it is common to have more than 40 access point devices) than shown in FIG. 1. The complexity of a managed network may be such that a network administrator may not have a full view of all of the components and dependencies of the network devices. Accordingly, some configuration changes that a network administrator intends to implement may have unintended or indirect consequences with respect to the connectivity of one or more network devices with the cloud management system 160.

Various embodiments of the subject technology relate to assuring that communications channels between network devices in the managed network 130 and the cloud management system 160 remain viable and preventing configuration changes in the managed network 130 from causing one or more of the network devices in the managed network 130 to lose connection with the cloud management system 160. For example, the cloud management system 160 may assure and protect communications between a network device in the managed network 130 and the cloud management system 160 by learning the path from the network device to the cloud management system and aggregating network connectivity data for the network devices along the path. The cloud management system 160 may further generate, based on the aggregated network connectivity data, a protected configuration for the network device. The protected configuration for the network device may relate to configuration settings applied to the network device as well as configuration settings applied to other network devices along the path from the network device to the cloud management system 160.

In subsequent operations, if a configuration change conflicts with the protected configuration, the cloud management system 160 may prevent the configuration change from being implemented and/or generate a notification that warns the network administrator that the configuration change may cause the network device to lose connectivity with the cloud management system. According to some embodiments, the cloud management system 160 may also detect when a network device in the managed network 130 loses connectivity with the cloud management system 160 and identify a potential root cause for the loss of connectivity. For example, the cloud management system 160 may identify specific configuration changes that conflict with the protected configuration of the network device and suggest that the configuration changes may have affected the device connectivity. The cloud management system 160 may further provide the network administrator to revert those configuration changes to a previous configuration or another configuration that does not conflict with the protected configuration for the network device.

According to some embodiments, continuous learning techniques may be used to improve the ability of the cloud management system 160 to more effectively prevent loss of connectivity with network devices and/or determine a root cause of a connection loss. For example, the cloud management system 160 may monitor configuration changes and connectivity status to network devices in the managed network 130. When a network device loses connectivity with the cloud management system 160, the cloud management system 160 may identify a configuration change that may be responsible for the connectivity loss (e.g., the configuration change that occurred most recently before the connection loss).

The cloud management system 160 can compare the configuration change caused the connectivity loss for the network device with another configuration where the network device maintained connectivity and identify one or more difference in the configurations and add the one or more differences to the protected configuration for the network device. The configuration that the problematic configuration change can be compared to may be, for example, a prior configuration where the network device had connectivity with cloud management system 160 or a subsequent configuration where the network device had connectivity (e.g., after a network administrator reestablished connectivity with the network device).

Figure 2:
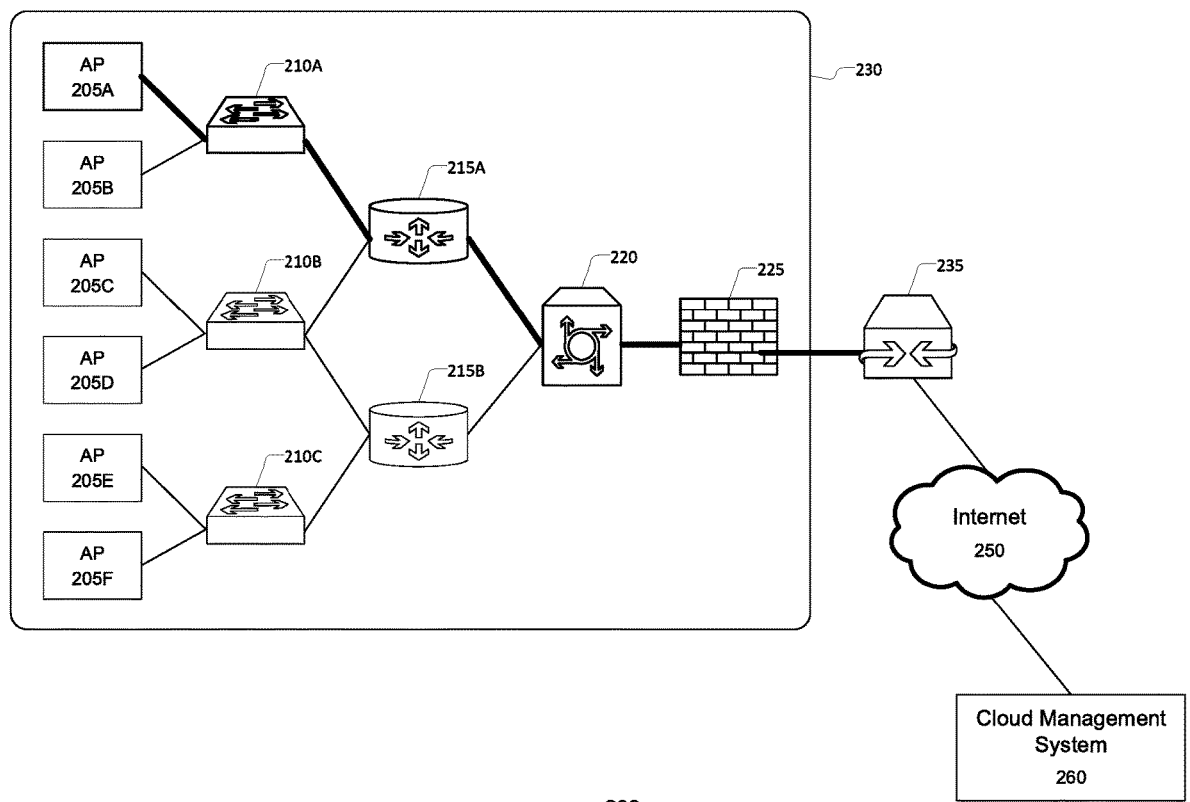
FIG. 2 is a conceptual block diagram illustrating an example network environment 200 that helps illustrate how a protected configuration is generated for a network device, in accordance with various embodiments of the subject technology.

FIG. 2 is a conceptual block diagram illustrating an example network environment 200 that helps illustrate how a protected configuration is generated for a network device, in accordance with various embodiments of the subject technology. The managed network 230 includes a number of network devices including access points 205A-F, switches 210A-C, routers 215A-B, a network address translation (NAT) server 220, and a firewall 225. The managed network 230 may connect to an internet service provider (ISP) gateway 235, which further connects the devices of the managed network 230 to the cloud management system 260 through the internet 250.

To generate a protected configuration for a network device in the managed network, the cloud management system 260 is configured to learn and store path information for the network device. For example, when access point 205A connects to the cloud management system 260, the cloud management system 260 may identify the intermediate devices in the managed network 230 on the network path from access point 205A to the cloud management system 260. The intermediate devices for access point 205A may include switch 210A, router 215A, NAT server 220, and firewall 225. The cloud management system 260 may identify the path for access point 205A based on a network topology or by tracing a route used by access point 205A to communicate with the cloud management system 260.

The cloud management system 260 is further configured to collect network connectivity data from the devices on the path (e.g., network connectivity data for access point 205A and the intermediate devices). The network connectivity data may include, for example, internet protocol (IP) addresses, port identifiers, routing protocol information, tunneling protocol (e.g., Transport Layer Security (TLS), Datagram Transport Layer Security (DTLS), etc.) information, access control lists (ACLs), Virtual Local Area Network (VLAN) information or site-to-site tunnel information, routing tables, subnet information, Dynamic Host Configuration protocol (DHCP) pool configuration information, domain name server (DNS) information, maximum transmission unit (MTU) size, or any other configuration information that may be used by the network device or intermediate network devices to communicate with the cloud management system 260.

Based on the network connectivity data, the cloud management system 260 can generate and store a protected configuration for the network device. The protected configuration for the network devices may include a list of configuration changes and/or actions on the network device or intermediate network devices that may disturb the connectivity of the network device to the cloud management system 260. Not all configuration settings for the network device or the intermediate network devices may be included in the protected configuration. For example, configurations, changes, or actions that do not affect the connectivity of the network device to the cloud management system 260 may not be included in the protected configuration for the network device.

To determine whether a particular configuration, change, or action may affect the connectivity of the network device, the cloud management system 260 may use a simulation engine to model various the configuration, change, or action to determine whether the simulated configuration, change, or action will affect the connectivity of the network device. If the configuration, change, or action will affect the connectivity of the network, either by itself or in combination with other configurations, changes, or actions, the cloud management system 260 may add the configuration, change, or action to the protected configuration for the network device. For example, the protected configuration for access point 205A may include various configurations or restricted actions for access point 205A, switch 210A, router 215A, NAT server 220, and firewall 225. The restricted actions may be, for example, turning off a port of a network device, removing or adding an IP address on an ACL list, or otherwise altering the configuration of a network device that may impact connectivity with the network device or other network devices.

As an example illustration, the protected configuration for access point 205A that are associated with access point 205A may include restrictions on shutting down the port(s) or interface(s) on access point 205A used to communicate with switch 210A, restrictions on changing VLAN settings on access point 205A, restrictions on IP addresses, or restrictions on changing routing table settings on access point 205A. The protected configurations may also prevent the addition of access control list (ACL) entries on access point 205A for a particular IP range. The protected configuration for access point 205A that are associated with switch 210A may include restrictions on shutting down the port(s) or interface(s) on switch 210A used to communicate with access point 205A or router 215A, restrictions on changing VLAN settings on switch 210A, restrictions on changing routing table settings on switch 210A, restrictions on IP addresses, or restrictions on changes to the DHCP pool configuration on switch 210A.

The protected configuration for access point 205A that are associated with router 215A may include restrictions on shutting down the port(s) or interface(s) on router 215A used to communicate with switch 210A or NAT server 220, restrictions on changing routing table settings on router 215A, restrictions on changes to the IPSEC tunnel configurations on router 215A, restrictions on changes to a default gateway, restrictions to changes to the DNS server settings on router 215A, or restrictions from adding ACL entries on router 215A for a particular IP range.

The protected configuration for access point 205A that are associated with NAT server 220 may include restrictions on shutting down the port(s) or interface(s) on NAT server 220 used to communicate with router 215A or firewall 225 or restrictions on changing TLS protocol configurations on NAT server 220. The protected configuration for access point 205A that are associated with firewall 225 may include restrictions on shutting down the port(s) or interface(s) on firewall 225 used to communicate with NAT server 220 or ISP gateway 235, restrictions on changing TLS protocol configurations on firewall 225, changes to destination IP address settings, or restrictions from adding ACL entries on firewall 225 for a particular IP range.

Although some of the example scenarios described with respect to FIG. 2 relates to generating a protected configuration for access point 205A, protected configurations for other network devices (e.g., switch 210C, router 215B, NAT server 220, and firewall 225) or other types and configurations of network devices may similarly be generated. Furthermore, other types of restrictions, configuration, or actions may be included in the protected configuration for those network devices.

The cloud management system 260 is configured to assure and protect connectivity between network devices in a cloud managed network and the cloud management system 260. For example, the cloud management system 260 may provide an interface that allows a network administrator to control and manage the network devices in the cloud managed network 230. According to some embodiments, the interface may be provided via a web server or application server to a remote user device associated with the network administrator. The use device may display the interface as a dashboard in a web browser or application.

Using the interface, the network administrator may view the current status of the managed network 230, identify issues, and make changes. These changes may be transmitted back to the cloud management system 260 for implementation. As the network administrator selects changes to make to the managed network, the cloud management system 260 may determine whether the selected change is compatible with the protected configurations for the network devices in the managed network 230. If the selected changes conflicts with one or more protected configurations, the cloud management system may generate a warning that notifies the network administrator that the selected changes may violate one or more protected configurations and/or cause one or more network devices to lose connectivity with the cloud management system 260.

Each protected configuration may correspond to a network device in the managed network 230 and violation of the protected configuration may indicate a possible loss of connectivity with the corresponding network device if the selected changes are implemented. The warning may be transmitted to the user device for delivery to the network administrator. The warning may further specified which network devices in the managed network may lose connectivity if the selected changes are implemented. The network administrator may also be provided options to alter the selected changes, cancel selected changes, or confirm the selected changes even though there may be risk that the selected changes may cause interruptions in connectivity with one or more network devices. If the network administrator confirms the selected changes, the cloud management system 260 may propagate the selected changes to the appropriate network devices in the managed network 230 for implementation.

Figure 3:
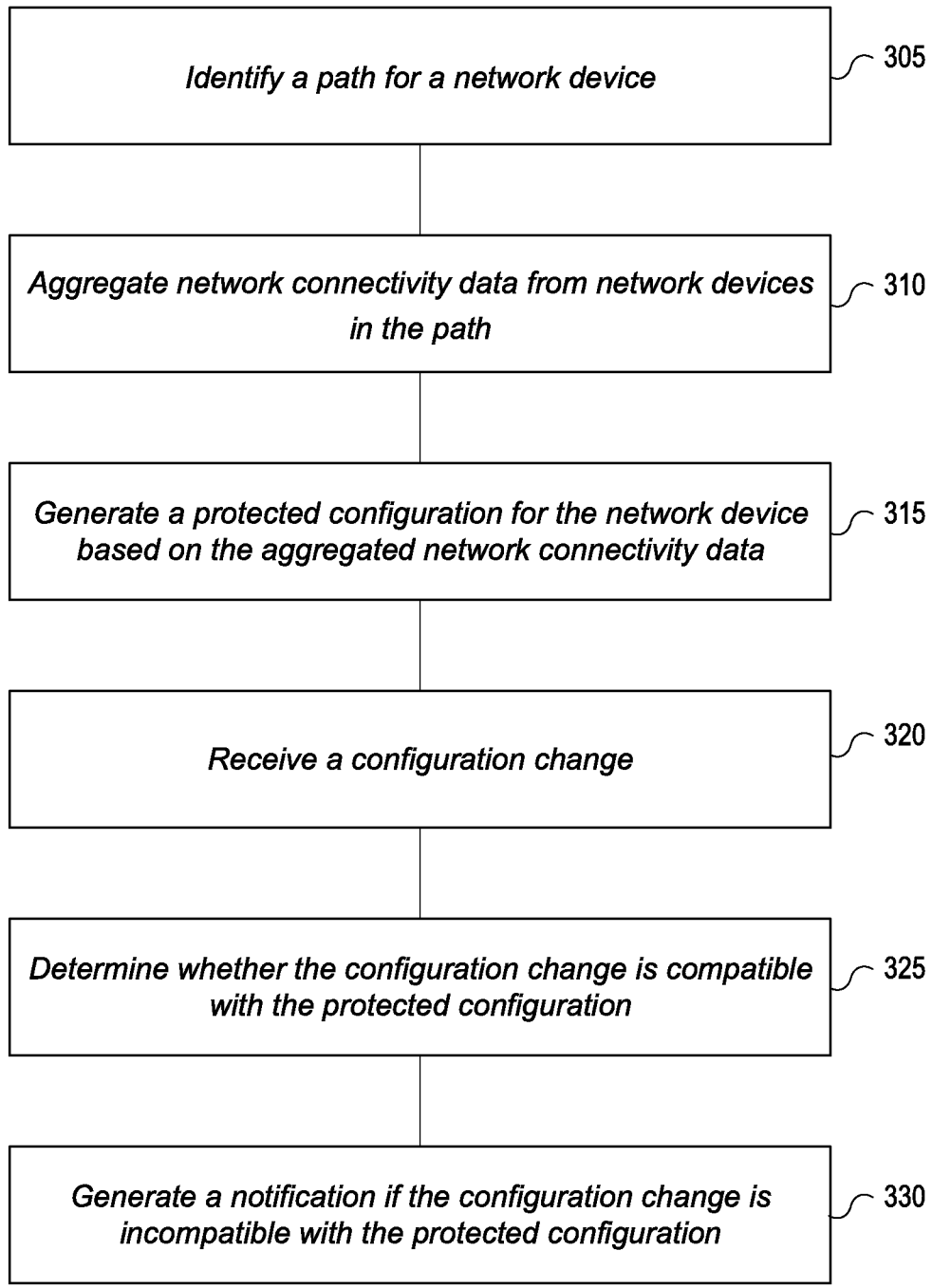
FIG. 3 shows an example process for assuring connectivity between a network device and the cloud management system, in accordance with various embodiments of the subject technology.

FIG. 3 shows an example process for assuring connectivity between a network device and the cloud management system, in accordance with various embodiments of the subject technology. It should be understood that, for any process discussed herein, there can be additional, fewer, or alternative steps performed in similar or alternative orders, or in parallel, within the scope of the various embodiments unless otherwise stated. The process 300 can be performed by a network, and particularly, a cloud management system or similar system (e.g., a cloud management node or network controller in the managed network). For illustrative purposes, the process 300 is described with respect to the generation and use of a protected configuration for a network device. However, the process 300 may also be repeated and applied to a large number of network devices.

At operation 305, the system may identify a path for the network device. The path for the network device may include the network device itself and intermediate network devices in the managed network that the network device uses to communicate to the system. At operation 310, the system aggregates the network connectivity data from the network devices in the path. The network connectivity data includes configuration data for the network devices in the path. The information may include, for example, internet protocol (IP) addresses, port identifiers, routing protocol information, tunneling protocol (e.g., Transport Layer Security (TLS), Datagram Transport Layer Security (DTLS), etc.) information, access control lists (ACLs), Virtual Local Area Network (VLAN) information or site-to-site tunnel information, routing tables, subnet information, and other such data. Based on the aggregated network connectivity data, the system generates a protected configuration for the network device at operation 315.

At operation 320, the system may receive a configuration change selected by a network administrator. The system may determine whether the configuration change is compatible with the protected configuration at operation 325. If the configuration change is compatible with the protected configuration, the configuration change may proceed with further checks (e.g., checks to determine whether the configuration change is compatible with other protected configurations for other network devices) and/or implemented in the managed network. If the configuration change is not compatible with the protected configuration, the system may generate a notification at operation 330. In other embodiments, the configuration change may be blocked.

In various embodiments, each network device may have an associated protected configuration. The protected configuration for a network device includes a listing of configuration changes and/or actions on the network device or intermediate network devices that may disturb the connectivity of the network device to the cloud management system. However, in other embodiments, the protected configuration for the network device may be a list of configuration changes and/or actions on the network device that may disturb the connectivity of the network device or other network devices in the managed network. Each listing may be tagged with a label indicating which network device may experience an impact in connectivity. For example, one or more entries in the protected configuration may be tagged with a "self-connectivity impact" label indicating that changes or actions defined by the specified entry may impact the connectivity of the network device with the cloud management system. Other entries in the protected configuration may be tagged with a "<neighboring device> connectivity impact" label indicating that changes or actions defined by the specified entry may impact the connectivity of a neighboring or other network device in the managed network. Furthermore, the tag may specify the specific network device(s) that may experience an impact in connectivity with the cloud management system. Accordingly, if a protected configuration is incompatible with a configuration change, the cloud management system may identify which network devices may be impacted.

Various aspects of the subject technology also relate to identifying possible root causes of lost connectivity between a network device in a cloud managed network and a cloud management system and helping network administrators reestablish connectivity. There may be several reasons why a network device may lose connectivity with a cloud management system. For example, a network administrator may force a configuration change into the managed network that affects one or more network devices, change the configuration of one or more network devices directly (without going through the interface provided by the cloud management system), or a protected configuration may not catch all configuration changes before they are implemented.

Figure 4:
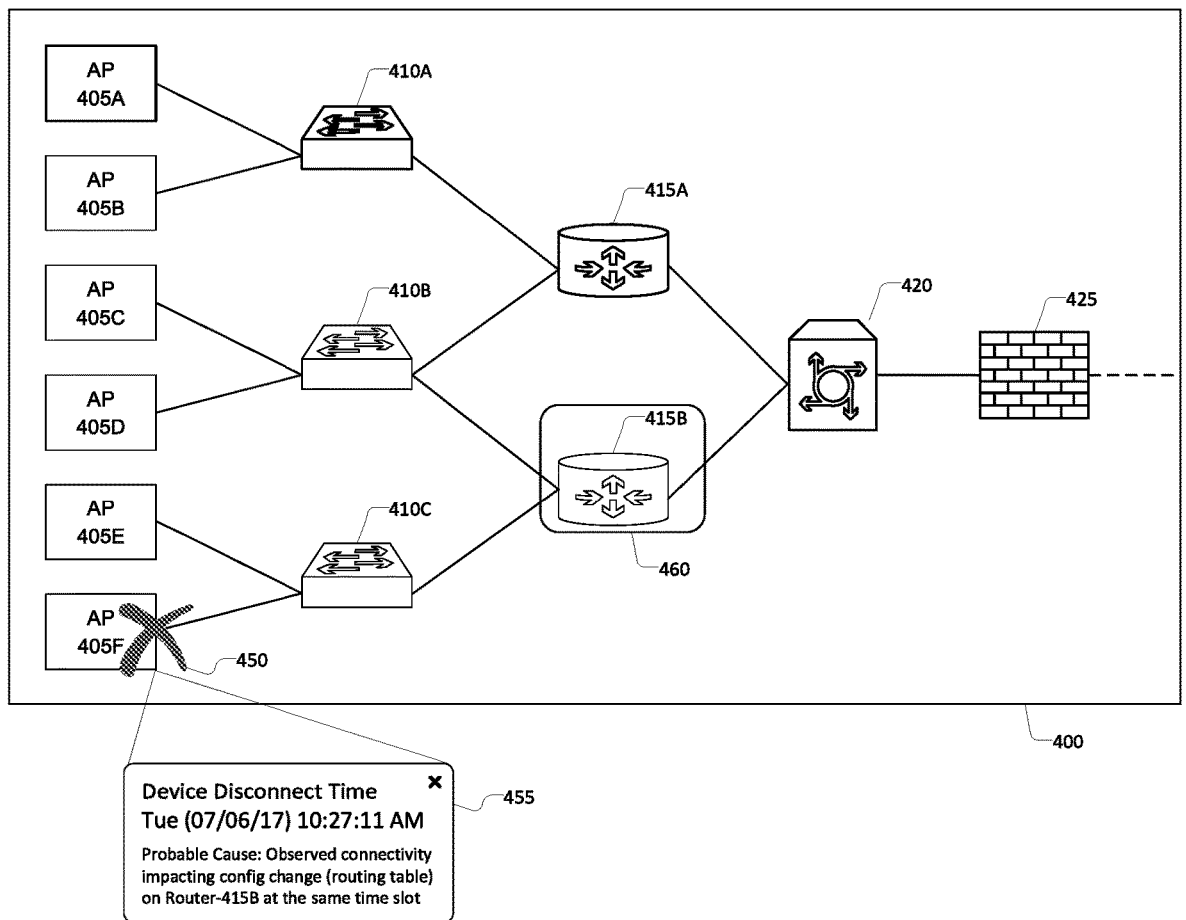
FIG. 4 shows an example user interface that indicates that a network device has lost connectivity with a cloud management system, in accordance with various embodiments of the subject technology.

FIG. 4 shows an example user interface 400 that indicates that a network device has lost connectivity with a cloud management system, in accordance with various embodiments of the subject technology. User interface 400 may be generated by the cloud management system and transmitted to a user device for display to a network administrator. User interface 400 may show a topology of network devices in a cloud managed network that is managed by the cloud management system. In some embodiments, the user interface 400 may be, be a part of, or embody a dashboard interface provided to network administrators. For example, user interface 400 shows including access points 405A-F, switches 410A-C, routers 415A-B, a network address translation (NAT) server 420, and a firewall 425.

The cloud management system may detect that a network device has lost connectivity with the cloud management system. For example, the cloud management system may determine that access point 405F has lost connectivity at a particular time. The cloud management system can identify a configuration change that occurred in the same time period or near in time and determine whether that configuration change is a possible cause of the lost connectivity. If the configuration change is a possible cause of the lost connectivity, the cloud management system can generate a notification for a network administrator.

For example, user interface 400 shows an interface element 450 indicating that access point 405F has lost connectivity. A notification interface element 455 may further indicate the time that access point 405F lost connectivity and that a possible cause of the lost connectivity is a configuration change for router 415B. The notification interface element 455 further specifies details of the configuration change (e.g., routing table configuration settings were changed). Router 415B may further be highlighted in the network topology by interface element 460. Although FIG. 4 illustrates the notification provided by the cloud management system as a notification in user interface 400 that may be displayed on a user device, in other embodiments, the notification may be provided via a mobile application, an email, a text message alert, or any other means of notification.

Figure 5:
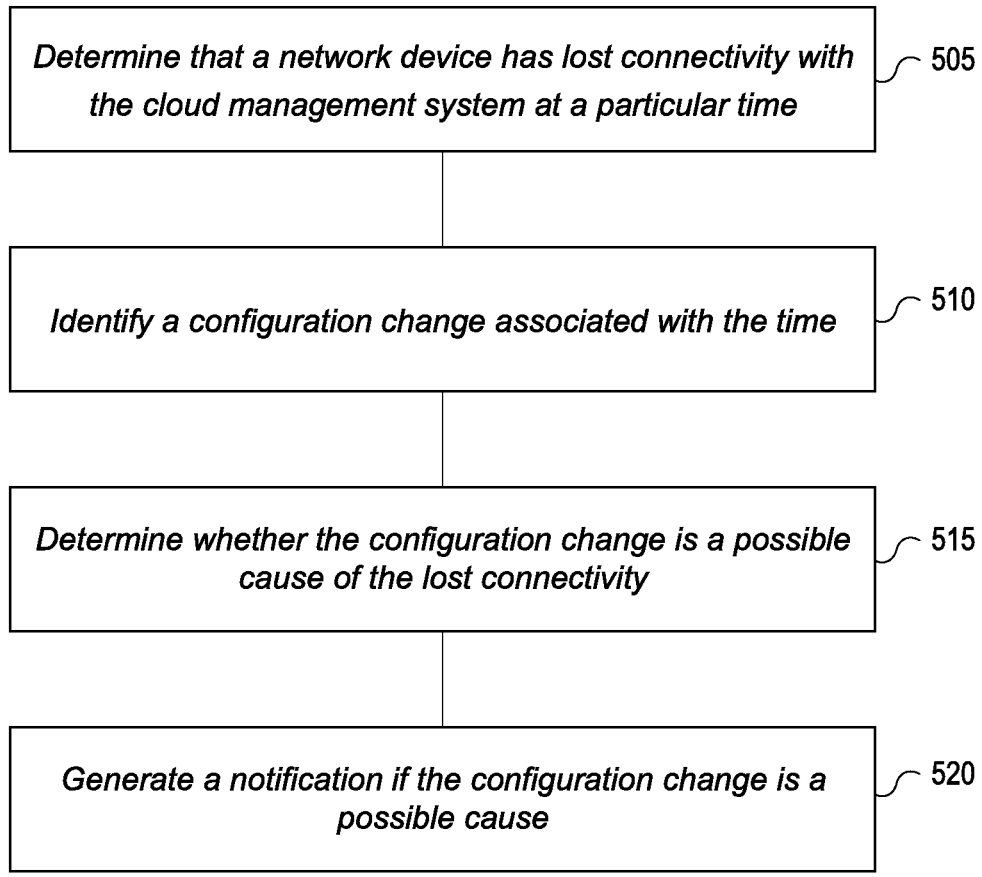
FIG. 5 shows an example process for identifying a possible root cause of a loss of connectivity between a network device and the cloud management system, in accordance with various embodiments of the subject technology.

FIG. 5 shows an example process 500 for identifying a possible root cause of a loss of connectivity between a network device and the cloud management system, in accordance with various embodiments of the subject technology. It should be understood that, for any process discussed herein, there can be additional, fewer, or alternative steps performed in similar or alternative orders, or in parallel, within the scope of the various embodiments unless otherwise stated. The process 500 can be performed by a network, and particularly, a cloud management system or similar system (e.g., a cloud management node or network controller in the managed network).

At operation 505, the system determines that a network device has lost connectivity with the cloud management system at a particular point in time. For example, the cloud management system may periodically ping network devices in a managed network and if the network device does not respond either to the first ping or repeated pings, the network device may be considered unreachable. Alternatively, the cloud management system may discover a network device has lost connectivity after an attempt to reach the network device for some other reason. In other example, network devices may be configured to periodically check in or transmit network data to the cloud management system. Failure to do so may indicate a loss of connectivity.

Configuration changes that occur at the cloud management system may be logged, timestamped, and stored. Details of other configuration changes (e.g., configurations changes that occur directly at a network device and not through an interface provided by the cloud management system) may be transmitted by the network device to the cloud management system for logging and storage. At operation 510, the system may identify a configuration change associated with the time that the network device lost connectivity. In some embodiments, the configuration change is within a predetermined threshold of the loss of connectivity. Alternatively, the system may select the configuration change that is closest in time or closest in time before loss of connectivity was discovered.

The system may determine whether the configuration change is a possible cause of the loss of connectivity at operation 515. In some embodiments, the configuration change is a possible cause if it is within the predetermined threshold of time or the closest in time to the detection of the lost connectivity. In other embodiments, the system may determine whether the configuration change violates a protected configuration. The configuration change is a possible cause if it violates a protected configuration. At operation 520, the system may generate a notification if the configuration change is a possible cause of the loss of connectivity between the network device and the cloud management system.

In some cases, not all configuration changes or actions that may affect the connectivity of one or more network devices may be reflected in the protected configurations known to the cloud management system. Various aspects of the subject technology relate to continuously learning, refining, and improving the protected configurations. For example, when a network device loses connectivity with the cloud management system, the cloud management system may retrieve configuration changes that occurred immediately before the network device lost connectivity to determine whether one or more of the configuration changes may have impacted the connectivity of the network device. If a configuration change may have impacted the connectivity, it can be added to the protected configuration for the network device.

In some embodiments, the cloud management system may retrieve a configuration state immediately before loss of connectivity or after the loss of connectivity if it can be obtained. The configuration state can be compared with a prior configuration state where the network device was reachable in order to identify differences between the configuration states. The differences can be added to the protected configuration for the network device.

In other embodiments, the cloud management system may retrieve a configuration state immediately before loss of connectivity or during the loss of connectivity if it can be obtained. The configuration state can be compared with a subsequent configuration state where the network device is reachable in order to identify differences between the configuration states. For example, the subsequent configuration state may be a result of a network administrator trouble shooting the loss of connectivity and reestablishing connectivity. One or more of the configuration states may be transmitted to the cloud management system once connectivity is reestablished. The differences between the two configuration states can be added to the protected configuration for the network device.

Figure 6A:
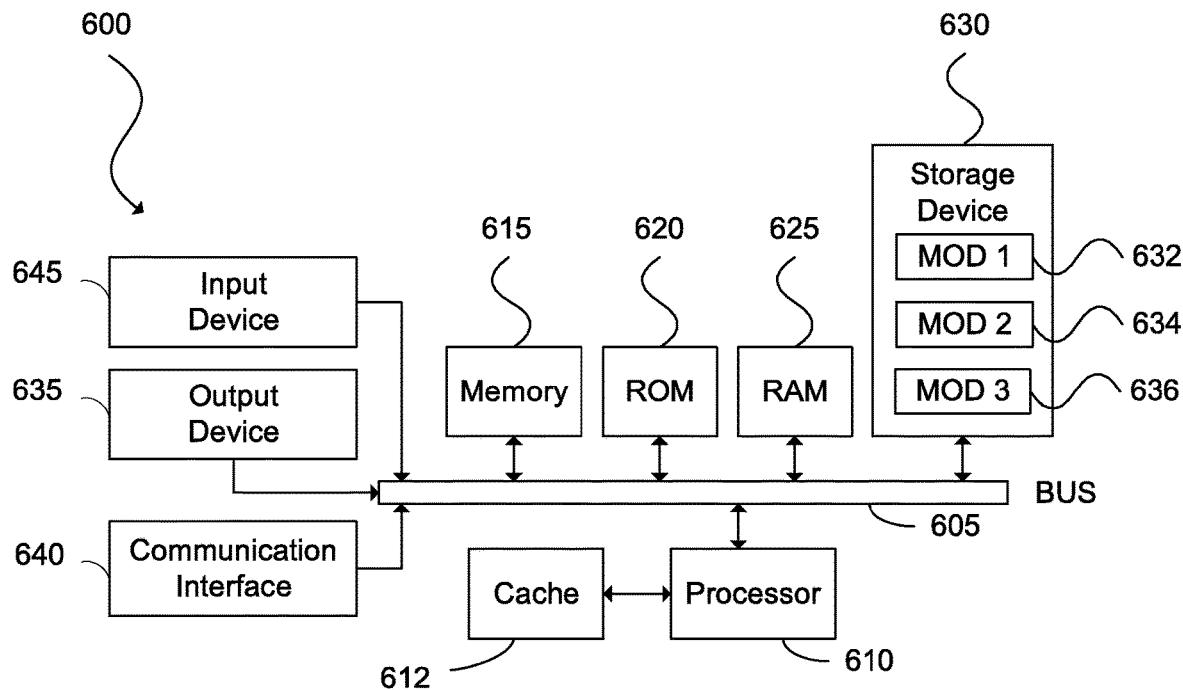
FIGS. 6A and 6B illustrate examples of systems in accordance with some embodiments.
Figure 6B:
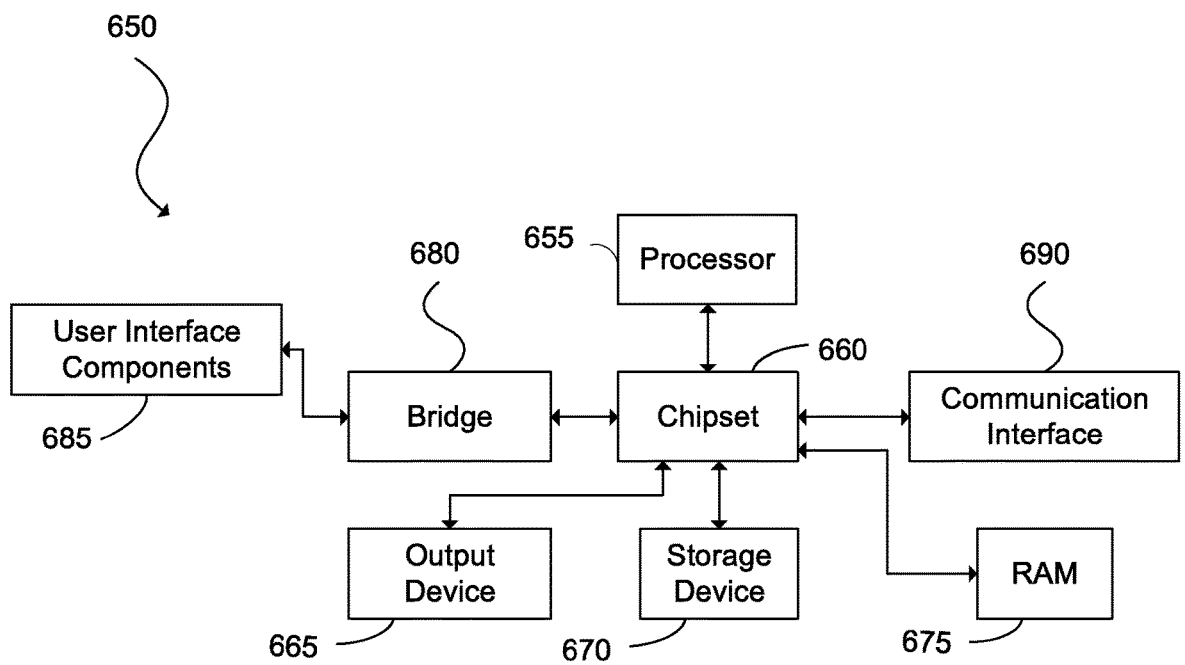

FIG. 6A and FIG. 6B illustrate systems in accordance with various embodiments. The more appropriate system will be apparent to those of ordinary skill in the art when practicing the various embodiments. Persons of ordinary skill in the art will also readily appreciate that other systems are possible.

FIG. 6A illustrates an example architecture for a bus computing system 600 wherein the components of the system are in electrical communication with each other using a bus 605. The computing system 600 can include a processing unit (CPU or processor) 610 and a system bus 605 that may couple various system components including the system memory 615, such as read only memory (ROM) in a storage device 620 and random access memory (RAM) 625, to the processor 610. The computing system 600 can include a cache 612 of high-speed memory connected directly with, in close proximity to, or integrated as part of the processor 610. The computing system 600 can copy data from the memory 615 and/or the storage device 630 to the cache 612 for quick access by the processor 610. In this way, the cache 612 can provide a performance boost that avoids processor delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing system 600, an input device 645 can represent any number of input mechanisms, such as a microphone for speech, a touch-protected screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing system 600. The communications interface 640 can govern and manage the user input and system output. There may be no restriction on operating on any particular hardware arrangement and therefore the basic features here may easily be substituted for improved hardware or firmware arrangements as they are developed.

Storage device 630 can be a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software modules 632, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, output device 635, and so forth, to carry out the function.

FIG. 6B illustrates an example architecture for a chipset computing system 650 that can be used in accordance with an embodiment. The computing system 650 can include a processor 655, representative of any number of physically and/or logically distinct resources capable of executing software, firmware, and hardware configured to perform identified computations. The processor 655 can communicate with a chipset 660 that can control input to and output from the processor 655. In this example, the chipset 660 can output information to an output device 665, such as a display, and can read and write information to storage device 670, which can include magnetic media, and solid state media, for example. The chipset 660 can also read data from and write data to RAM 675. A bridge 680 for interfacing with a variety of user interface components 685 can be provided for interfacing with the chipset 660. The user interface components 685 can include a keyboard, a microphone, touch detection and processing circuitry, a pointing device, such as a mouse, and so on. Inputs to the computing system 650 can come from any of a variety of sources, machine generated and/or human generated.

The chipset 660 can also interface with one or more communication interfaces 690 that can have different physical interfaces. The communication interfaces 690 can include interfaces for wired and wireless LANs, for broadband wireless networks, as well as personal area networks. Some applications of the methods for generating, displaying, and using the GUI disclosed herein can include receiving ordered datasets over the physical interface or be generated by the machine itself by processor 655 analyzing data stored in the storage device 670 or the RAM 675. Further, the computing system 600 can receive inputs from a user via the user interface components 685 and execute appropriate functions, such as browsing functions by interpreting these inputs using the processor 655.

It will be appreciated that computing systems 600 and 650 can have more than one processor 610 and 655, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware, and/or software, and can take any of a variety of form factors. Examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method comprising:
    aggregating network connectivity data for a plurality of devices in a first network managed by a cloud management system, wherein the plurality of devices in the first network connect to the cloud management system via a second network external to the first network;
    generating, based on the network connectivity data, a protected configuration for at least one device in the plurality of devices in the first network;
    accessing a configuration change for the first network;
    determining whether the configuration change is compatible with the protected configuration;
    generating, when the configuration change is incompatible with the protected configuration, a notification configured to notify a network administrator that the configuration change is incompatible with the protected configuration;
    determining that one or more devices from the plurality of devices in the first network have lost connectivity with the cloud management system;
    obtaining a first network state and a second network state for the first network, wherein the first network state is associated with the lost connectivity, and wherein the second network state is associated with connectivity between the one or more devices and the cloud management system;
    identifying differences between the first network state and the second network state; and
    updating, based on the differences, a respective protected configuration for the one or more devices.

2. The computer-implemented method of claim 1, further comprising:
    identifying a network path in the first network from the at least one device to the cloud management system, wherein the plurality of devices are in the network path.

3. The computer-implemented method of claim 1, wherein the protected configuration for the at least one device includes a list of configuration changes or actions that impact connectivity of the at least one device.

4. The computer-implemented method of claim 1, wherein the protected configuration for the at least one device includes a list of configuration changes or actions associated with the at least one device that impact connectivity of the first network.

5. The computer-implemented method of claim 1, further comprising transmitting the notification to a user device, wherein the notification is provided to the network administrator on a dashboard interface on the user device.

6. The computer-implemented method of claim 1, receiving the configuration change for the first network from a user device.

7. The computer-implemented method of claim 1, wherein the network connectivity data comprises at least one of an interface internet protocol (IP) address, a port identifier, an access control list (ACL), a VLAN or site-to-site tunnel, a tunneling protocol, a routing table, a DHCP pool configuration, or a neighboring device identifier.

8. The computer-implemented method of claim 1, wherein the configuration change is incompatible with the protected configuration when the configuration change includes at least one change to the protected configuration.

9. The computer-implemented method of claim 1, further comprising:
    requesting a confirmation of acceptance of the configuration change;
    receiving the confirmation of acceptance of the configuration change; and
    transmitting, in response to the confirmation, the configuration change to the plurality of devices in the first network.

10. The computer-implemented method of claim 1, further comprising:
    determining that the at least one device has lost connectivity with the cloud management system during a time period;
    identifying a second configuration change implemented during the time period;
    determining whether the second configuration change is a cause of the lost connectivity; and
    generating a second notification based on the second configuration change being the cause of the lost connectivity.

11. The computer-implemented method of claim 1, further comprising:
    identifying a cause of the lost connectivity based on the differences between the first network state and the second network state, wherein updating the respective protected configuration for the one or more devices comprises adding a restriction associated with the cause to the respective protected configuration.

12. A non-transitory computer-readable medium comprising instructions, the instructions, when executed by a computing system, cause the computing system to:
    aggregate network connectivity data for a plurality of devices in a managed network, wherein the plurality of devices in the managed network connect to a cloud management system;
    generate, based on the network connectivity data, a protected configuration for a device in the plurality of devices in the managed network;
    receive a configuration change for the plurality of devices in the managed network;
    determine that the configuration change is incompatible with the protected configuration;
    transmit, to a user device, based on the configuration change being incompatible with the protected configuration, a notification that the configuration change is incompatible with the protected configuration;
    determine that one or more devices from the plurality of devices in the managed network have lost connectivity with the cloud management system;
    obtain a first network state and a second network state for the managed network, wherein the first network state is associated with the lost connectivity, and wherein the second network state is associated with connectivity between the one or more devices and the cloud management system;

identify differences between the first network state and the second network state; and update, based on the differences, a respective protected configuration for the one or more devices.

13. The non-transitory computer-readable medium of claim 12, wherein the instructions further cause the computing system to identify a network path in the managed network from the device of the plurality of devices to the cloud management system.

14. The non-transitory computer-readable medium of claim 12, wherein the protected configuration for the device includes a list of configuration changes or actions that impact connectivity of the device.

15. A system comprising:

a processor; and a non-transitory computer-readable medium storing instructions that, when executed by the system, cause the system to:

generate a protected configuration for a network device based on network connectivity data for a plurality of devices, wherein the plurality of devices are in a managed network associated with a cloud management system and wherein the plurality of devices are in a network path from the network device to the cloud management system;

receive a configuration change for the managed network;

determine that the configuration change is incompatible with the protected configuration;

generate, based on the configuration change being incompatible with the protected configuration, a notification that the configuration change is incompatible with the protected configuration;

determine that one or more devices from the plurality of devices in the managed network have lost connectivity with the cloud management system;

obtain a first network state and a second network state for the managed network, wherein the first network state is associated with the lost connectivity, and wherein the second network state is associated with connectivity between the one or more devices and the cloud management system;

identify differences between the first network state and the second network state; and update, based on the differences, a respective protected configuration for the one or more devices.

16. The system of claim 15, wherein the instructions further cause the system to:

determine the network path from the network device to the cloud management system associated with the managed network; and retrieve network connectivity data for the plurality of devices in the network path.

17. The system of claim 15, wherein the protected configuration for the network device includes a list of configuration changes or actions that impact connectivity of the network device.

18. The system of claim 15, wherein the configuration change is received from a dashboard interface on a user device and wherein the instructions further cause the system to transmit the notification to the user device for display on the dashboard interface.

19. The system of claim 15, wherein the network connectivity data comprises at least one of an interface internet protocol (IP) address, a port identifier, an access control list (ACL), a VLAN or site-to-site tunnel, a tunneling protocol, a routing table, a DHCP pool configuration, or a neighboring device identifier.

20. The system of claim 15, wherein the configuration change is incompatible with the protected configuration when the configuration change includes at least one change to the protected configuration.

* * * * *